United States Patent Office 3,560,469
Patented Feb. 2, 1971

3,560,469
PROCESS FOR POLYMERIZING STYRENE
Raymond Plepys and Richard Waack, Midland, Mich., assignors to The Dow Chemical Company, Midland, Mich.
No Drawing. Filed Nov. 25, 1968, Ser. No. 778,817
Int. Cl. C08f 7/04
U.S. Cl. 260—93.5                                     6 Claims

ABSTRACT OF THE DISCLOSURE

An improved process for the anionic polymerization of styrene using polysiloxanes as promoters in the polymerization reaction and as agents for controlling the molecular weight of the polymer in alkylbenzene solvents.

---

This invention concerns an improved process and agents for the anionic polymerization of vinyl aromatic hydrocarbons. It relates more particularly to the anionic polymerization of styrene in an alkyl benzene solvent using a sodium base catalyst.

U.S. Pat. No. 2,327,080 polymerizes unsaturated compounds, particularly conjugated diene compounds, employing sodium as the catalyst and saturated aliphatic, acrylic mono- or polyethers, or certain dialkylamino ethers as solvent and reaction medium.

It has now been discovered that vinyl aromatic hydrocarbons, having the vinyl group directly attached to a carbon atom of the aromatic nucleus, can readily be polymerized in nuclear substituted alkylbenzenes as solvent and reaction medium in contact with a sodium base catalyst and a polysiloxane as more fully hereinafter described.

Surprisingly, it has been found that not only does the polysiloxane have an action of increasing the rate of polymerization of the vinyl aromatic compound in the hydrocarbon solvent, but that the polysiloxane has an action of causing the formation of polymer of high molecular weight and of narrow molecular weight distribution, i.e. polymer wherein the ratio of the weight average molecular weight Mw to the number of average molecular weight Mn is less than 3.0.

The polysiloxanes to be employed in the invention are the fluid, liquid to grease-like benzene-soluble polysiloxanes in which the siloxane units consist of units of the structural formula $R_2SiO$ wherein R is a radical selected from the group consisting of the alkyl radicals and the phenyl radical. The polysiloxane can be one in which all of the siloxane units are alkyl, e.g. $(CH_3)_2SiO$, or the siloxane may be a copolymer of dimethyl siloxane and units $C_6H_5(CH_3)SiO$ or $(C_6H_5)_2SiO$. Cyclic polysiloxanes such as octamethylcyclotetrasiloxane can also be used. The polysiloxanes are preferably normally liquid silicone fluids or greases such as are readily available on the open market in the form of liquids or greases per se. The polysiloxane is employed in practice of the invention in an amount corresponding to from about 0.05 to 5.0 percent by weight of the vinyl aromatic hydrocarbon, e.g. styrene, employed.

The nuclear substituted alkyl benzenes to be employed as solvent and reaction medium can be an aromatic hydrocarbon having the general formula

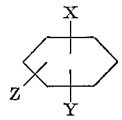

wherein X is an alkyl radical having from 1 to 4 carbon atoms and Y and Z are independently selected from the group consisting of hydrogen and alkyl radicals having from 1 to 4 carbon atoms, with the proviso that said hydrocarbon contains a total of not more than 15 carbon atoms.

Among suitable hydrocarbons are toluene, xylene, mesitylene, ethylbenzene, diethylbenzene, triethylbenzene, isopropylbenzene, diisopropylbenzene, triisopropylbenzene, tert.-butylbenzene, di-tert.-butylbenzene, ethyltoluene, isopropyltoluene, butyltoluene, ethylxylene, ethylmesitylene, sec.-butylbenzene, butylbenzene and butylxylene.

The hydrocarbon solvent is used in amount sufficient to maintain the reaction mixture in solution, or as a readily flowable slurry of the mixture of materials.

The sodium base catalyst can be a sodium alkyl or sodium aryl compound, e.g. amylsodium, butylsodium, hexylsodium, benzylsodium, or phenylsodium. Such sodium alkyls and sodium aryls and methods of making the same are well known in the art and need not be further discussed. In an alternative procedure sodium metal can be used to form the sodium aryl or sodium alkyl in situ.

The polymerization reaction can be carried out at temperatures between about —40° and 200° C., preferably from about 10° to 120° C., and at atmospheric, subatmospheric, or superatmospheric pressures.

In practice, the vinyl aromatic hydrocarbon, e.g. styrene, to be polymerized is mixed with a suitable aromatic hydrocarbon solvent and reaction medium such as ethylbenzene. To this solution is added the polysiloxane of the kind and desired amount. Thereafter, the sodium base catalyst, e.g. amylsodium, is added. The polymerization reaction usually occurs immediately and is exothermic. Cooling of the mixture is carried out if necessary to avoid a runaway reaction with resultant loss of control of the polymerization. Upon completing or substantially completing the polymerization, the polymer is recovered in usual ways The polymer can be recovered by evaporating the solvent, preferably under subatmospheric pressure, or by mixing the solution of the polymer and solvent with methanol to precipitate the polymer. The precipitated polymer is separated by filtering and is washed and dried.

The following examples illustrate ways in which the principle of the invention has been applied but are not to be construed as limiting its scope.

EXAMPLE 1

To a charge of 100 ml. of a 15 weight percent solution of styrene in ethylbenzene at 25° C. there was added 0.1 ml. of octamethylcyclotetrasiloxane, followed by 0.05 millimole of amylsodium slurried in methylcyclohexane. An immediate exothermic reaction occurred. The temperature of the mixture increased to 60° C. A few minutes after the exotherm had ceased, the mixture was poured into methanol. A 10 ml. aliquot of the thick polymer solution contained 1.57 grams of polymer. The conversion of monomeric styrene to polymer was quantitative. The polymer had a number average molecular weight of 163,000 and a weight average molecular weight Mw to number average molecular weight Mn of Mw/Mn of 1.58, as determined by gel permeation chromatography.

In contrast, when the polymerization was carried out without the siloxane a quantitative yield of polymer is obtained, but it had a number average molecular weight of only 2800 and a ratio of Mw/Mn of 5.1.

EXAMPLE 2

The procedure of Example 1 was repeated, except adding 0.2 ml. of octamethylcyclotetrasiloxane. The conversion was quantitative. The polystyrene had a number average molecular weight of 123,000 and an Mw/Mn ratio of 1.93.

EXAMPLE 3

The procedure of Example 1 was repeated except adding 1 ml. of a 10 weight percent solution of silicone grease. The polystyrene had a number average molecular weight of 80,500 and an Mw/Mn ratio of 1.93.

EXAMPLE 4

The procedure of Example 1 was repeated, except adding 0.1 ml. of Dow Corning silicone fluid 710. The polystyrene had a number average molecular weight of 161,000 and an Mw/Mn ratio of 1.59.

Similar results are obtained when other nuclear substituted alkyl benzenes such as toluene, diethylbenzene, xylene, mesitylene, isopropylbenzene, diisopropylbenzene, triethylbenzene, tert-butylbenzene, sec.-butylbenzene, dibutylbenzene, or triisopropylbenzene are used as the solvent and reaction medium in place of the ethylbenzene used in the examples.

We claim:

1. A process for the anionic polymerization of styrene which comprises contacting styrene with a sodium base catalyst in a liquid nuclear alkylsubstituted benzene containing from 0.05 to 5.0 percent, based on the weight of the styrene, of a polysiloxane of the formula $R_2SiO$ wherein R is a radical selected from the group consisting of alkyl radicals and the phenyl radical.

2. A process as claimed in claim 1 wherein the polysiloxane is octamethylcyclotetrasiloxane.

3. A process as claimed in claim 1 wherein the sodium base catalyst is amylsodium.

4. A process as claimed in claim 1 wherein the alkyl substituted benzene is ethylbenzene.

5. A process as claimed in claim 1 wherein the sodium base catalyst is metallic sodium.

6. A process for the anionic polymerization of styrene which comprises contacting styrene with a sodium base catalyst in ethylbenzene containing from 0.05 to 5.0 percent based on the weight of the styrene of a polysiloxane of the formula $R_2SiO$ wherein R is a radical selected from the group consisting of alkyl radicals and the phenyl radical.

References Cited

UNITED STATES PATENTS

| | | | |
|---|---|---|---|
| 2,920,065 | 1/1960 | Myerholtz, Jr., et al. | 260—93.5 |
| 3,004,014 | 10/1961 | Myerholtz, Jr., et al. | 260—93.5 |
| 3,248,377 | 4/1966 | Arnold et al. | 260—93.5 |
| 3,408,340 | 10/1968 | Tanaka et al. | 260—93.5 |

JAMES A. SEIDLECK, Primary Examiner